United States Patent Office 2,857,378
Patented Oct. 21, 1958

2,857,378
PURIFICATION OF BETA-GLUCOSE PENTAACETATE

Ralph A. Hales, West Chester, Pa., and Robert H. Varland, Wilmington, Del., assignors to Atlas Powder Company, Wilmington, Del., a corporation of Delaware No Drawing. Application May 15, 1956
Serial No. 584,897

6 Claims. (Cl. 260—234)

This invention relates to a process for the purification of beta-glucose pentaacetate.

More specifically it relates to a process of separating beta-glucose pentaacetate from an acetylation mixture comprising alpha and beta-glucose pentaacetates.

It is an object of the present invention to provide an improved process for the purification of beta-glucose pentaacetate.

Another object is to provide a process for the recovery of beta-glucose pentaacetate from the acetylation mixture in which it is formed by the reaction of glucose and acetic anhydride in the presence of a suitable catalyst.

A further object is to provide a process for the separation of beta-glucose pentaacetate from a mixture comprising beta-glucose pentaacetate and alpha-glucose pentaacetate.

These and other objects will become apparent in the course of the following description and claims.

Beta-glucose pentaacetate is conveniently prepared by the reaction of glucose with acetic anhydride in the presence of a suitable catalyst under conditions well known in the art of acetylation. One customary method includes the reaction of an excess amount of acetic anhydride on glucose in the presence of a catalytic amount of sodium acetate or potassium acetate. The desired product is obtained as a part of a mixture that also contains the alpha-isomer together with unreacted acid, catalyst and possibly other materials. The beta-isomer has, in the past, been recovered by repeated steps of solution and partial crystallization of the beta-glucose pentaacetate fraction using aqueous ethanol or other suitable organic solvent. The recovery procedure is costly and slow and on a commercial scale, the problems of solvent recovery and fire hazard are presented.

In accordance with the present invention it has been discovered that good quality beta-glucose pentaacetate can be recovered from mixtures containing it and the alpha form without resorting to the recrystallization from alcohol or other suitable solvent.

More specifically, it has been found that beta-glucose pentaacetate can be separated from alpha-glucose pentaacetate or from an acetylation mixture resulting from the reaction of acetic anhydride with glucose by dissolving the alpha form in aqueous acetic acid of appropriate strength at a given temperature and separating the beta-glucose pentaacetate by filtration and washing.

According to the present invention, a mixture containing both alpha and beta-glucose pentaacetates may be added to an acetic acid solution. This solution dissolves the alpha-glucose pentaacetate preferentially and the beta ester may be separated by filtration and purified by washing with water. It is preferred to use controlled conditions of temperature and concentration of acetic acid in the separating medium. The solubility of both alpha and beta-glucose pentaacetates has been found to increase with an increase in either temperature or acetic acid content. However, the beta-glucose pentaacetate has been found to be less soluble than the alpha-glucose pentaacetate.

It has been found that a satisfactory yield of good quality beta-glucose pentaacetate can be recovered from mixtures containing it and the alpha form when the temperature of the acetic acid solution is from about 30° to about 70° C. Below about 30° C. the beta-glucose pentaacetate recovered will contain amounts of alpha-glucose pentaacetate which are often considered undesirable. Conversely, above about 70° C. is unduly high for most purposes. A range of temperature of from about 45° to about 60° C. is usually preferred for optimum separations.

The acetic acid concentration of the solution also affects the separation. Concentrations ranging from about 5% to about 50% based on the weight of water, usually provides satisfactory yields of good quality beta-glucose pentaacetate from a mixture of alpha and beta-glucose pentaacetate. A preferred range of final acetic acid concentration of the drowning bath is from about 15% to about 30%.

In one preferred embodiment of the present invention, beta-glucose pentaacetate is recovered from an acetylation mixture resulting from the action of acetic anhydride being employed in excess of the amount required for complete acetylation of the glucose by diluting the acetylation mixture with a sufficient quantity of water so that the acid concentration of the aqueous mixture is between about 15% to about 30%, maintaining the diluted mixture at from about 45° to about 60° C. and then separating the beta-glucose pentaacetate from the mixture by filtration and washing.

The following examples illustrate several specific embodiments of the invention.

Example 1

To an acetylation kettle is added 278 lbs. of acetic anhydride and 15.3 lbs. of anhydrous sodium acetate, the charge being heated with agitation to 100° C. after which is added 77 lbs. of anhydrous glucose at the rate of about 2.5 lbs. per minute. The temperature of the acetylation mixture is maintained between 113° and 118° C. for one hour after the glucose addition and then cooled to 60° C. after which the reaction product contains a mixture of alpha and beta-glucose pentaacetate, about 20% of which is alpha-ester. The charge is then dropped into 22.8 gallons of water at 60° C. with stirring until completely dissolved. To the drowned charge is added 71.3 gallons of water at 60° C. with stirring. The acetic acid concentration, after the final addition of water, is about 17.5%. The agitated mass is held at about 55° to about 60° C. for one hour with slow stirring and crystallization of the beta-glucose pentaacetate takes place. The precipitated beta-glucose pentaacetate is filtered and the filter cake washed with water at a temperature of about 50° C. to recover the beta-glucose pentaacetate crystals. The final dry product weighing 95.4 lbs. of beta-glucose pentaacetate analyzed as follows:

| | |
|---|---|
| Percent H$_2$O | 0.05 |
| Percent acid as acetic | 0.009 |
| Percent normal ash | 0.004 |
| Specific rotation $[\alpha]_D^{20}$ (10% in CHCl$_3$) | 4.0 |
| Melting point, ° C | 131.2 |
| Melting point range, ° C | 0.5 |
| Yield percent of theory | 57.8 |
| Percent $\alpha$ ester | 0.3 |

While the above process has been described as a two step drowning process, the acetylation mixture may be dropped in one step into sufficient water (94.1 gal.) at 60° C. to effect separation of good quality beta-glucose pentaacetate from the remaining products of the acetylation mixture.

For the Examples 2 through 7, glucose acetylation is conducted by using 30% excess acetic anhydride based on the weight of the glucose and potassium acetate as catalyst in place of sodium acetate. The acetylation mixture was drowned in sufficient water in each case, to give a final acetic acid concentration as shown in column 3 of the following table:

| Example | Drowning Bath Temp., °C. | Calculated Acid in Drowning Bath, Percent | Yield, Percent of Theory | α G. P. A. in Dry, Filtered Product, Percent |
|---------|--------------------------|-------------------------------------------|--------------------------|----------------------------------------------|
| 2       | 45                       | 17.8                                      | 67.3                     | 1.8                                          |
| 3       | 50                       | 17.8                                      | 64.6                     | 1.5                                          |
| 4       | 55                       | 17.8                                      | 58.6                     | 0.2                                          |
| 5       | 60                       | 17.8                                      | 53.0                     | 0.2                                          |
| 6       | 60                       | 11.8                                      | 59.7                     | 0.8                                          |
| 7       | 60                       | 20.6                                      | 46.3                     | 0.3                                          |

*Example 8*

A crude mixture of alpha and beta-glucose pentaacetate containing 13.4% of the alpha-ester was drowned in 6.6 parts by weight based on the crude mixture of 20% acetic acid at a temperature of 60° C. The aqueous mixture was stirred to dissolve the alpha-glucose pentaacetate and maintained at 60° C. for 1.5 hours. The undissolved product was washed and dried. The final dry product of beta-glucose pentaacetate contained 1.2% of alpha-glucose pentaacetate.

The hereinabove described process may easily be adapted to a continuous operation by the application of known engineering principles. Furthermore, many variations of the above disclosed invention will be apparent to those skilled in the art without departing from the inventive concept.

What is claimed is:

1. A process for the recovery of beta-glucose pentaacetate from a mixture of alpha and beta-glucose pentaacetate which comprises agitating said mixture at a temperature of from about 30° C. to about 70° C. in an aqueous solution of acetic acid containing between about 5% and about 50% of acetic acid and separating solid beta-glucose pentaacetate from the solution.

2. A process as described in claim 1 wherein the acid concentration is from about 15% to about 30% and the holding temperature of said mixture is from about 45° to about 60° C.

3. A process for the recovery of beta-glucose pentaacetate from an acetylation mixture resulting from the action of acetic anhydride on glycose in the presence of a catalyst, said acetic anhydride being employed in excess of the amount required for complete acetylation of the glucose, which comprises diluting the acetylation mixture with a quantity of water so that the acid concentration of the aqueous mixture is from about 5% to about 50%, agitating the diluted mixture at from about 30° C. to about 70° C., and separating solid beta-glucose pentaacetate from the mixture.

4. A process as described in claim 3 wherein the acid concentration of the aqueous mixture is from 15% to 30% and the diluted mixture is maintained at a temperature of from about 45° to about 60° C.

5. A process as in claim 3 wherein said catalyst is selected from the group consisting of sodium and potassium acetate.

6. A process as in claim 4 wherein said catalyst is selected from the group consisting of sodium and potassium acetate.

References Cited in the file of this patent

"Nature," vol. 161, page 349 (1948), Nichols et al.